US012033845B2

(12) United States Patent
Szilagyi et al.

(10) Patent No.: US 12,033,845 B2
(45) Date of Patent: Jul. 9, 2024

(54) LASER-SUSTAINED PLASMA SOURCE BASED ON COLLIDING LIQUID JETS

(71) Applicant: KLA Corporation, Milpitas, CA (US)

(72) Inventors: John Szilagyi, Livermore, CA (US); Ilya Bezel, Mountain View, CA (US)

(73) Assignee: KLA Corporation, Milpitas, CA (US)

( * ) Notice: Subject to any disclaimer, the term of this patent is extended or adjusted under 35 U.S.C. 154(b) by 39 days.

(21) Appl. No.: 18/132,162

(22) Filed: Apr. 7, 2023

(65) Prior Publication Data

US 2023/0335389 A1 Oct. 19, 2023

Related U.S. Application Data

(60) Provisional application No. 63/331,895, filed on Apr. 18, 2022.

(51) Int. Cl.

| | |
|---|---|
| ***H01J 65/04*** | (2006.01) |
| ***H01J 61/02*** | (2006.01) |
| ***H01J 61/16*** | (2006.01) |
| ***H01J 61/28*** | (2006.01) |
| ***H01J 61/52*** | (2006.01) |

(52) U.S. Cl.

CPC .......... *H01J 65/042* (2013.01); *H01J 61/025* (2013.01); *H01J 61/16* (2013.01); *H01J 61/28* (2013.01); *H01J 61/52* (2013.01)

(58) Field of Classification Search

CPC ........ H01J 65/042; H01J 65/025; H01J 61/28; H01J 61/16; H01J 61/52; H05G 2/00; H05G 2/001; H05G 2/003; H05G 2/006; H05G 2/008

USPC ..................................................... 250/504 R

See application file for complete search history.

(56) References Cited

U.S. PATENT DOCUMENTS

| | | | | |
|---|---|---|---|---|
| 5,608,526 | A | 3/1997 | Piwonka-Corle et al. | |
| 5,999,310 | A | 12/1999 | Shafer et al. | |
| 6,297,880 | B1 | 10/2001 | Rosencwaig et al. | |
| 6,998,785 | B1 * | 2/2006 | Silfvast .................. | H05G 2/003 118/723 MP |
| 7,435,982 | B2 | 10/2008 | Smith | |
| 7,525,649 | B1 | 4/2009 | Leong et al. | |
| 7,786,455 | B2 | 8/2010 | Smith | |
| 7,957,066 | B2 | 6/2011 | Armstrong et al. | |
| 7,989,786 | B2 | 8/2011 | Smith et al. | |
| 8,182,127 | B2 | 5/2012 | Yasuda et al. | |
| 8,309,943 | B2 | 11/2012 | Smith et al. | |
| 8,525,138 | B2 | 9/2013 | Smith et al. | |

(Continued)

OTHER PUBLICATIONS

Korean Intellectual Property Office, International Search Report and Written Opinion for International Application No. PCT/US2023/018766, dated Aug. 7, 2023, 6 pages.

*Primary Examiner* — Jason L McCormack

(74) *Attorney, Agent, or Firm* — Suiter Swantz pc llo

(57) ABSTRACT

A laser-sustained broadband light source includes a gas containment structure and multiple jet nozzles. The jet nozzles are configured to direct multiple liquid jets of plasma-forming material in directions to collide with one another within the gas containment structure. The laser-sustained broadband light source further includes a laser pump source configured to generate an optical pump to sustain a plasma in a region of the gas containment structure at a collision point of the plurality of liquid jets and a light collector element configured to collect broadband light emitted from the plasma.

19 Claims, 5 Drawing Sheets

(56) References Cited

U.S. PATENT DOCUMENTS

| | | | | |
|---|---|---|---|---|
| 8,921,814 | B2 | 12/2014 | Pellemans et al. | |
| 9,318,311 | B2 | 4/2016 | Chimmalgi et al. | |
| 9,390,902 | B2 | 7/2016 | Bezel et al. | |
| 9,497,843 | B1 * | 11/2016 | Kaganovich | H05H 15/00 |
| 10,806,016 | B2 | 10/2020 | Khodykin et al. | |
| 2004/0129896 | A1 | 7/2004 | Schmidt et al. | |
| 2007/0002465 | A1 | 1/2007 | Chuang et al. | |
| 2012/0146511 | A1 * | 6/2012 | Kuwabara | H05G 2/006 315/111.71 |
| 2012/0228525 | A1 * | 9/2012 | Moriya | H05G 2/008 250/504 R |
| 2013/0114085 | A1 | 5/2013 | Wang et al. | |
| 2014/0042336 | A1 | 2/2014 | Bezel et al. | |
| 2016/0005588 | A1 | 1/2016 | Park et al. | |
| 2016/0169814 | A1 | 6/2016 | Hashimoto et al. | |
| 2021/0136901 | A1 | 5/2021 | Chang et al. | |

* cited by examiner

LASER-SUSTAINED PLASMA SOURCE BASED ON COLLIDING LIQUID JETS

CROSS-REFERENCE TO RELATED APPLICATION

The present application claims priority to U.S. Provisional Application Ser. No. 63/331,895, filed Apr. 18, 2022, which is incorporated herein by reference in the entirety.

TECHNICAL FIELD

The present invention generally relates to plasma-based radiation sources, and, more particularly, to laser sustained plasma (LSP) broadband light sources including multiple liquid jets to provide a stable high-density, low-velocity gas region within a low-density gas volume for LSP generation.

BACKGROUND

As the demand for integrated circuits having ever-smaller device features continues to increase, the need for improved illumination sources used for inspection of these ever-shrinking devices continues to grow. One such illumination source includes a laser-sustained plasma (LSP) radiation source. Laser-sustained plasma light sources are capable of producing high-power broadband light. Laser-sustained plasma light sources operate by focusing laser radiation into a gas volume in order to excite the gas, such as argon or xenon, into a plasma state, which is capable of emitting light. This effect is typically referred to as "pumping" the plasma.

An increase of radiance of LSP sources requires a plasma to be sustained in a high-pressure environment to achieve higher gas density in the plasma region. Typical high-density gas based LSP sources rely on high pressure gas to reach required plasma densities. For example, in broadband plasma (BBP) sources the operating pressures are on the order of 100 bar. High gas density can be achieved with high pressure convective gas chamber volumes, or with high pressure gas jets into a low-pressure chamber volume. Fluctuations in flow in convective gas volumes can lead to plasma instabilities. The above-listed solution also requires additional safety management due to large volume of compressed gas required. In addition, these plasmas can display limited brightness due to the surrounding gas volume being heated by pump light, thereby growing the size of the plasma, as well as reducing plasma temperature due to absorbed light not reaching the plasma center.

The use of a liquid jet has been proposed to provide local high-density gas delivered to the LSP. In this case, LSP should burn near the surface of the liquid. The evaporated liquid rapidly expands into a low-pressure volume providing a high density gradient. The high local density and corresponding pressure causes fast gas flow through the plasma region, which may prevent the plasma from being sustained. In order to sustain the plasma in the supersonic gas flow expected for such arrangements, very high pump powers are needed (more than about 100 kW CW).

Therefore, it would be desirable to provide a system and method that cure one or more shortfalls of the previous approaches identified above.

SUMMARY

A laser-sustained broadband light source is disclosed, in accordance with one or more embodiments of the present disclosure. In embodiments, the light source includes a gas containment structure. In embodiments, the light source includes a plurality of jet nozzles, wherein the plurality of jet nozzles are configured to direct a plurality of liquid jets to collide within the gas containment structure, wherein the plurality of liquid jets include a first liquid jet and at least a second jet. In embodiments, the light source includes a laser pump source configured to generate an optical pump to sustain a plasma in a region of the gas containment structure at a collision point of the plurality of liquid jets. In embodiments, the light source includes a light collector element configured to collect at least a portion of broadband light emitted from the plasma. In embodiment, the broadband light source may be incorporated within an optical characterization system, such as an optical inspection system or a metrology system.

A method of broadband light generation is disclosed, in accordance with one or more embodiments of the present disclosure. In embodiments, the method includes generating a plurality of liquid jets to collide within a gas containment structure, wherein the plurality of liquid jets include a first liquid jet and at least a second jet. In embodiments, the method includes generating an optical pump. In embodiments, the method includes focusing the optical pump into a region of the gas containment structure at a collision point of the plurality of liquid jets to sustain a plasma in the region of the gas containment structure at the collision point of the plurality of the liquid jets. In embodiments, the method includes collecting a portion of broadband light emitted from the plasma and delivering the portion of the broadband light to one or more optical elements external to the gas containment structure.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures.

DETAILED DESCRIPTION

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Referring generally to FIGS. 1-4, a laser-sustained plasma (LSP) broadband light source with multiple impinging liquid jets is described, in accordance with one or more embodiments of the present disclosure. Embodiments of the present disclosure are directed to an LSP broadband light source including two or more impinging high density, high velocity liquid jets in a low gas density environment. The colliding jets create a high density, low velocity stable gas region at the point of their collision. The velocity at the point of the collision approaches zero. At this point of collision, the LSP may be generated by focusing the pump laser to this point. Having a near-zero velocity region helps guarantee plasma sustainability at lower pump power. Outside of the region of high-pressure low velocity, the gas is free to expand. The outside region is a gas outflow region which is characterized by lower gas density and increasing velocity. The gas pressure drops rapidly as a function of distance from the collision point. For example, the pressure can drop from over 100 bar at the collision point of the jets to less than 20 bar within a few hundred microns (e.g., 200-500 microns) of the collision point. Even if the plasma is sustained in this peripheral region, the plasma is optically thin due to the low gas density, allowing for efficient laser coupling to the central point of the plasma and also for collection of light without re-absorption in these peripheral regions.

Figure 1A:
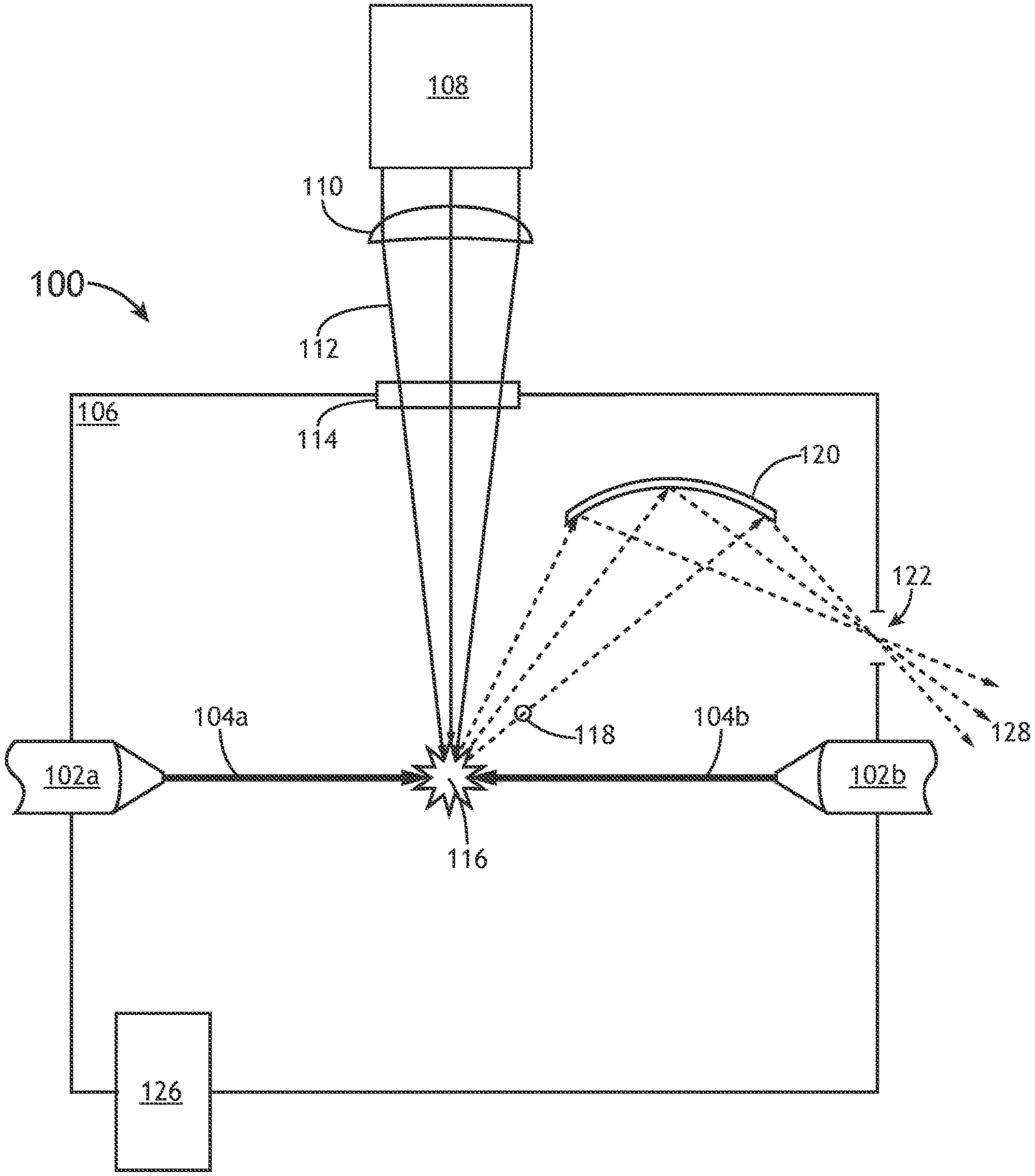
FIG. 1A illustrates a simplified schematic view of an LSP broadband light source with two liquid jets for supplying plasma-generating material, in accordance with one or more embodiments of the present disclosure.

FIG. 1A illustrates a simplified schematic view of a broadband LSP light source 100, in accordance with one or more embodiments of the present disclosure. In embodiments, the LSP broadband light source 100 includes a set of jet nozzles for generating a set of liquid jets to collide with a gas containment chamber 106. For example, the set of jet nozzles may include a first jet nozzle 102*a* and a second jet nozzle 102*b* for delivering target material jets 104*a*, 104*b*, respectively, to collide within the gas containment structure 106 (e.g., chamber, lamp, or cell). The LSP source 100 may also include a laser pump source 108, pump laser focusing optics 110, and light collector element 120. It is noted that FIG. 1A depicts the case where the gas containment structure 106 is a gas containment chamber. For the purposes of this disclosure, the gas containment structure will be referred to as a gas containment chamber 106, however the scope of the present disclosure should not be limited to a chamber as any gas containment vessel is within the scope of the present disclosure. For example, the gas containment structure 106 may include, but is not limited to, a plasma chamber, a plasma cell, or a plasma lamp.

The LSP source 108 may be configured to generate a pump beam 112, which acts an optical pump to sustain the plasma 116 in a region of the chamber 106 at a collision point of the liquid jets 104*a*, 104*b*. The pump beam 112 may be focused by pump laser focusing optics 110. In embodiments, the pump laser focusing optics 110 direct the pump beam 112 through a pump laser window 114 into the chamber 106 and focuses the pump beam 112 to the collision point between the first liquid jet stream 104*a* and the second liquid jet stream 104*b* so as to generate and/or sustain a plasma 116. It is noted herein that the pump laser focusing optics 110 may include any optical element known in the art for directing and/or focusing radiation including, but not limited to, a lens, a mirror, a prism, a polarizer, a grating, a filter, or a beam-splitter.

The pump source 108 may include any pump source known in the art suitable for igniting and/or sustaining plasma. For example, the pump source 108 may include one or more lasers (e.g., pump lasers). In embodiments, pump source 108 includes one or more continuous-wave (CW) laser sources. For example, the pump source 108 may include one or more CW infrared laser sources. In embodiments, the pump source 108 may include one or more pulsed lasers configured to provide pulsed laser light to the plasma 116. For example, the pump source 108 may include one or more pulsed lasers having a repetition rate greater than 50 kHz (e.g., greater than 100 kHz). In embodiments, the pump source 108 may include a combination of one or more CW and one or more pulsed lasers.

The pump beam 112 may include radiation of any wavelength or wavelength range known in the art including, but not limited to, infrared (IR) radiation, near infrared (NIR) radiation, ultraviolet (UV) radiation, visible radiation, or other radiation suitable to form a plasma when incident on a suitable target material It is noted herein that the LSP broadband light source 100 may include one or more additional ignition sources used to facilitate the generation of the plasma 116 without departing from the spirit or scope of the present disclosure. For example, the chamber 106 may include one or more electrodes which may initiate and/or maintain the plasma 116.

In embodiments, the broadband light 118 generated by the plasma 116 exits the chamber 106 through one or more apertures 122. For example, the light collector element 120 may be arranged so as to collect broadband light 118 from the plasma 116 and, in turn, direct at least a portion of the collected broadband light through the one or more apertures 122. In embodiments, the one or more apertures 122 include one or more windows (e.g., material transparent to the broadband light). In embodiments, the one or more apertures 122 are windowless and located in the wall of the chamber 106. The one or more apertures 122 may include, but are not limited to, a hole, a port, an outlet, a vent, a space or any other opening allowing the broadband light 118 to exit the chamber 106 through the wall of the chamber 106 and may be windowed or windowless.

In embodiments, the chamber 106 is fluidically coupled to a vacuum pump 126. In embodiments, the pressure in the chamber 106 is maintained at a selected pressure. The vacuum pump 126 may remove gas (e.g., gas ejected from the plasma, buffer gas) from the chamber 106 to maintain a selected pressure in the chamber 106. It is noted that gas evacuation may take place at the same rate as the total input flow from jets. In addition, pressure within the chamber 106 should be maintained at a low enough level to reduce laser light absorption around the plasma 116.

In embodiments, the light collector element 120 includes one or more optical elements known in the art configured to collect broadband light 118 including, but not limited to, one or more mirrors, one or more prisms, one or more lenses, one or more diffractive optical elements, one or more parabolic mirrors, one or more elliptical mirrors, and the like. It is noted herein that the light collector element 120 may be configured to collect and/or focus broadband light 118 generated by plasma 116 to be used for one or more down-stream processes including, but not limited to, imaging processes, inspection processes, metrology processes, lithography processes, and the like. For example, the light collector element 120 may direct broadband light 118 to a collection location 128. For example, the light collector element 120 may deliver infrared, visible, NUV, UV, DUV, and/or VUV radiation to downstream optical elements of any optical characterization system known in the art, such as, but not limited to, an inspection tool, a metrology tool, or a lithography tool. In this regard, the broadband light 118 may be coupled to the illumination optics of an inspection tool, metrology tool, or lithography tool.

Figure 1B:
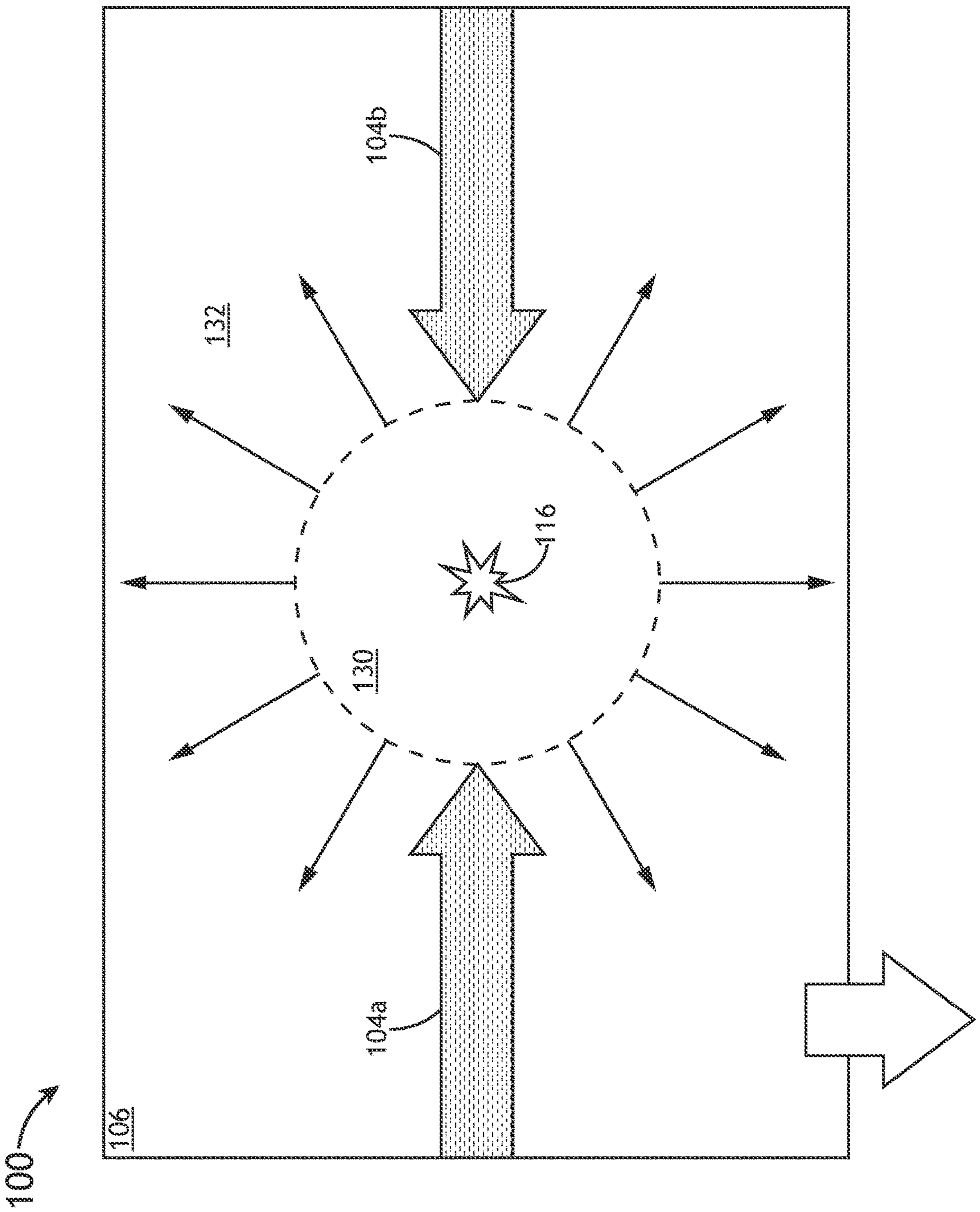
FIG. 1B illustrates a conceptual view of the LSP broadband light source with two liquid jets for supplying plasma-generating material, in accordance with one or more embodiments of the present disclosure.

FIG. 1B illustrates a conceptual view the broadband LSP light source 100, in accordance with one or more embodiments of the present disclosure. The colliding jets 104*a*, 104*b* create a stable high-density and low-velocity region 130 at the point of their collision. Due to the offsetting individual momentums of the jets, the velocity of the gas in the region 130 approaches zero. Having a near-zero velocity helps ensure the sustainability of the plasma 116 at lower pump power. Outside of the high-density and low-velocity region 130, the gas is free to expand into a gas outflow region 132, which is characterized by lower gas density and higher velocity.

In embodiments, the gas pressure in the plasma 116 is between 50-500 bar. In order to reach such pressures, the liquid jets 104*a*, 104*b* must have sufficient diameter and velocity. Such high pressures may be obtained with liquid jet velocities of approximately 50-200 m/s (e.g., 75-125 m/s). In embodiments, the diameters of the jets 104*a*, 104*b* are 50-500 microns (e.g., 150-250 microns). The jets 104*a*, 104*b* may be completely evaporated by the heat and radiation emanating from the plasma 116.

In embodiments, the gas pressure drops rapidly as a function of distance from the collision point of the jets 104*a*, 104*b*. In this regard, the pressure may drop from over 100 bar to less than 20 bar within a few hundred microns (e.g., 200-500 microns) from the collision point. Moreover, even if the plasma is sustained in this peripheral region, it is optically thin because of low gas density, which allows for efficient laser coupling to the central region of the plasma 116 and also for collection of light without re-absorption of broadband light 118 in the peripheral regions of the plasma 116.

The jets 104*a*, 104*b* may include any material suitable for generating plasma. In embodiments, the jets may include liquid jets of cryogenically cooled liquids. For example, the liquids may include, but are not limited to, liquid Ar, liquid Kr, liquid Xe, liquid $N_2$, liquid $CH_4$, liquid $NH_3$, and the like. In embodiments, the jets may include jets of liquids held at room temperature. For example, the liquids may include, but are not limited to, liquid $H_2O$ and the like. In embodiments, one or more materials may be delivered as solvents within a solute. For example, one or more salts (e.g., salts of heavy metals) may be dissolved in a liquid (e.g., $H_2O$) and delivered into the chamber 106 via jets 104*a*, 104*b*. In embodiments, one or more materials may be delivered as a suspension within a liquid. For example, the suspension may include, but is not limited to, a metal suspended in water, Xe suspended in liquid $N_2$, and the like. In embodiments, two or more materials may be delivered as mixtures. For example, a mixture of liquids may include, but is not limited to, a mixture of Ar and Xe, a mixture of Ar, Kr, and Xe, and the like.

In embodiments, the jets 104*a*, 104*b* may deliver a mixture of liquid and gas material. For example, the jets 104*a*, 104*b* may include a gas-liquid mixture such as, but not limited to, Ar/Xe, Ar/Kr, and the like.

In embodiments, the jets 104*a*, 104*b* may include a solid material. For example, the jets 104*a*, 104*b* may include solid $H_2O$ or solid Xe. It is noted herein that solid jets may be employed in lower pressure chambers, where liquid jets experience on the way to the collision point.

While much of the description has focused on describing the LSP source 100 with two jet nozzles 102*a*, 102*b* and two jets 104*a*, 104*b*, it is noted herein that such a description was provided merely for convenience and clarity. It is noted that the LSP source 100 is not limited to two jet nozzles and two jets and the LSP source 100 may include any number of jet nozzles and corresponding jets. For example, the LSP source 100 may include 2, 3, 4, 5, 6, 7, 8 (and so on) jet nozzles and corresponding jets.

Figure 2:
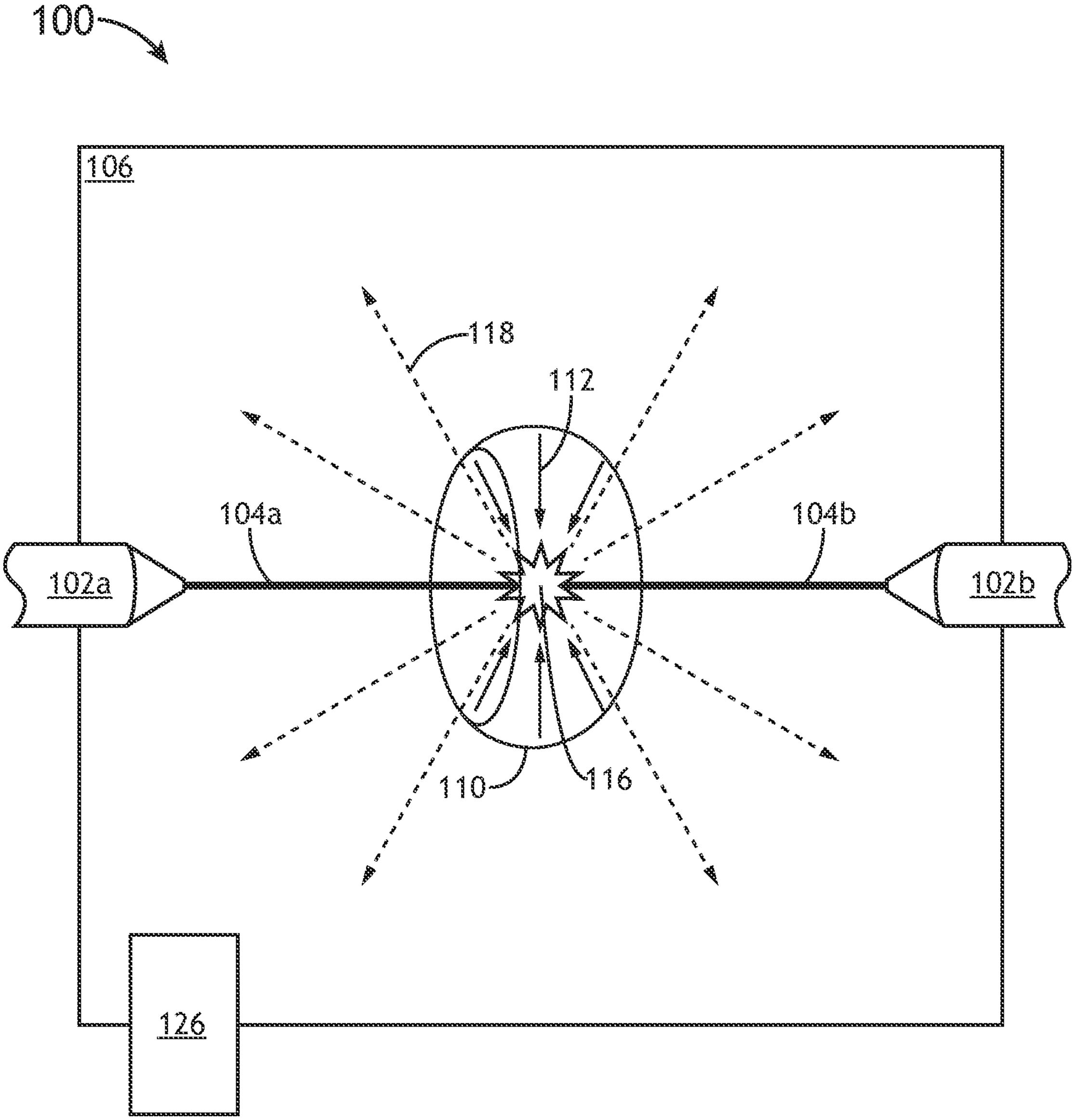
FIG. 2 illustrates a simplified schematic view of the LSP broadband light source with an annular-shaped pump optical element, in accordance with one or more embodiments of the present disclosure.

FIG. 2 illustrates a simplified schematic view of the broadband LSP light source 100, in accordance with one or more embodiments of the present disclosure. In this embodiment, the pump laser focusing optics 110 may include one or more annular optics. For example, the pump laser focusing optics 110 may include an annular mirror. For instance, as depicted in FIG. 2, the pump laser focusing optics 110 may include an annular mirror positioned such that the center-point of the mirror is co-located with the collision point between the first jet 104*a* and the second jet 104*b*. Such an arrangement will cause pump illumination 112 from the pump source 108 (not shown in FIG. 2 for clarity) to be directed to the collision point between the first and second jets 104*a*, 104*b*.

The generation of a laser-sustained plasma is also generally described in U.S. Pat. No. 7,435,982, issued on Oct. 14, 2008, which is incorporated by reference herein in the entirety. The generation of plasma is also generally described in U.S. Pat. No. 7,786,455, issued on Aug. 31, 2010, which is incorporated by reference herein in the entirety. The generation of plasma is also generally described in U.S. Pat. No. 7,989,786, issued on Aug. 2, 2011, which is incorporated by reference herein in the entirety. The generation of plasma is also generally described in U.S. Pat. No. 8,182,127, issued on May 22, 2012, which is incorporated by reference herein in the entirety. The generation of plasma is also generally described in U.S. Pat. No. 8,309,943, issued on Nov. 13, 2012, which is incorporated by reference herein in the entirety. The generation of plasma is also generally described in U.S. Pat. No. 8,525,138, issued on Feb. 9, 2013, which is incorporated by reference herein in the entirety. The generation of plasma is also generally described in U.S. Pat. No. 8,921,814, issued on Dec. 30, 2014, which is incorporated by reference herein in the entirety. The generation of plasma is also generally described in U.S. Pat. No. 9,318,311, issued on Apr. 19, 2016, which is incorporated by reference herein in the entirety. The generation of plasma is also generally described in U.S. Pat. No. 9,390,902, issued on Jul. 12, 2016, which is incorporated by reference herein in the entirety. In a general sense, the various embodiments of the present disclosure should be interpreted to extend to any plasma-based light source known in the art.

Figure 3:
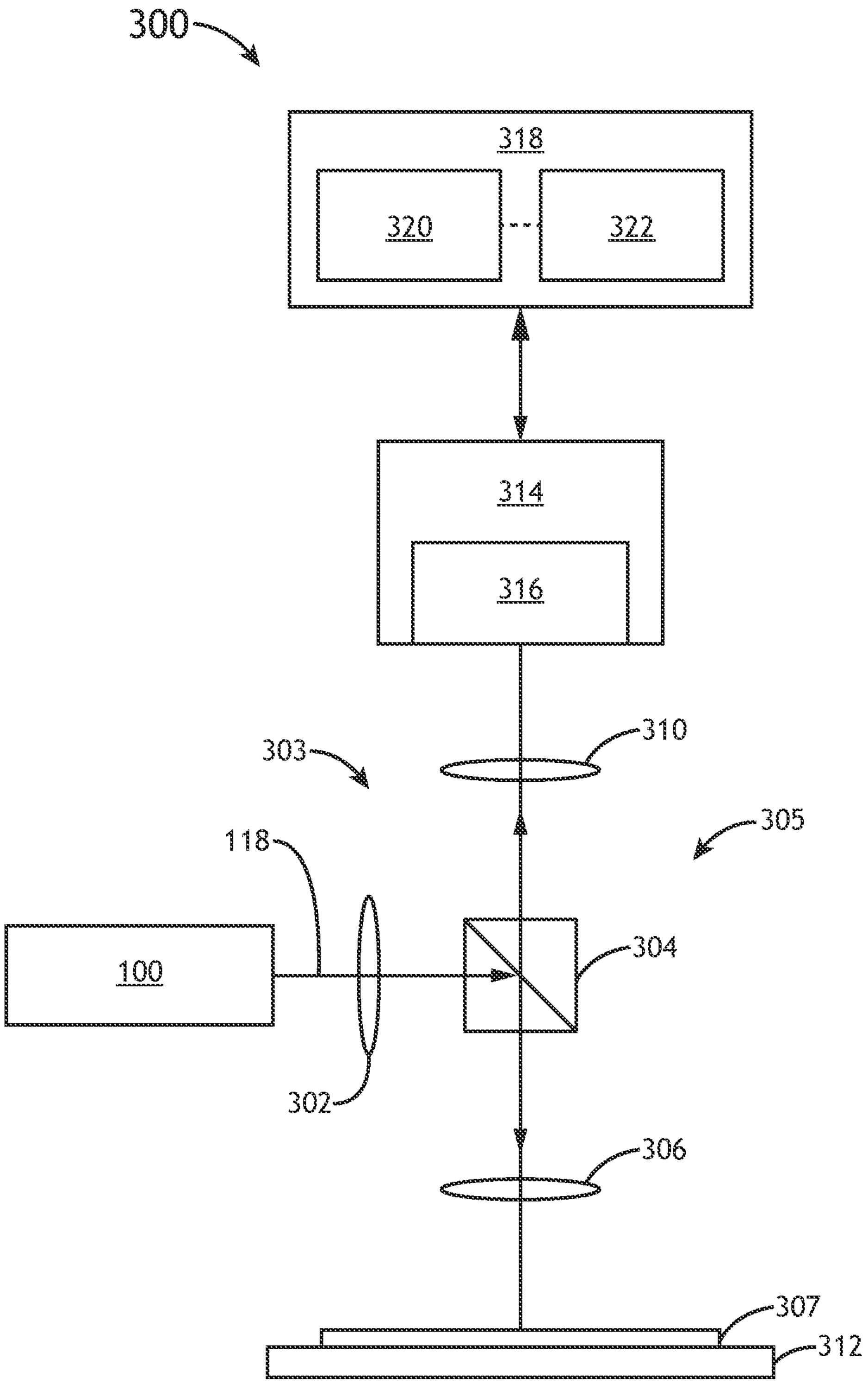
FIG. 3 illustrates a simplified schematic view of an optical characterization system implementing the LSP radiation source, in accordance with one or more embodiments of the present disclosure.

FIG. 3 illustrates a simplified schematic view of an optical characterization system 300 implementing the LSP broadband light source 100, in accordance with one or more embodiments of the present disclosure. In embodiments, system 300 includes the LSP light source 100, an illumination arm 303, a collection arm 305, a detector assembly 314, and a controller 318 including one or more processors 320 and memory 322.

It is noted herein that system 300 may comprise any imaging, inspection, metrology, lithography, or other characterization system known in the art. In this regard, system 300 may be configured to perform inspection, optical metrology, lithography, and/or any form of imaging on a specimen 307. Specimen 307 may include any sample known in the art including, but not limited to, a wafer, a reticle, a photomask, and the like. It is noted that system 300 may incorporate one or more of the various embodiments of the LSP light source 100 described throughout the present disclosure.

In embodiments, specimen 307 is disposed on a stage assembly 312 to facilitate movement of specimen 307. Stage assembly 312 may include any stage assembly 312 known in the art including, but not limited to, an X-Y stage, an R-θ stage, and the like. In embodiments, stage assembly 312 is capable of adjusting the height of specimen 307 during inspection or imaging to maintain focus on the specimen 307.

In embodiments, the illumination arm 303 is configured to direct broadband light 118 from the LSP broadband light source 100 to the specimen 307. The illumination arm 303 may include any number and type of optical components known in the art. In embodiments, the illumination arm 303 includes one or more optical elements 302, a beam splitter 304, and an objective lens 306. In this regard, illumination arm 303 may be configured to focus broadband light 118 from the LSP broadband light source 100 onto the surface of the specimen 307. The one or more optical elements 302 may include any optical element or combination of optical elements known in the art including, but not limited to, one or more mirrors, one or more lenses, one or more polarizers, one or more gratings, one or more filters, one or more beam splitters, and the like. It is noted herein that the collection location 128 may include, but is not limited to, one or more of the optical elements 302, a beam splitter 304, or an objective lens 306.

In embodiments, system 300 includes a collection arm 305 configured to collect light reflected, scattered, diffracted, and/or emitted from specimen 307. In embodiments, collection arm 305 may direct and/or focus the light from the specimen 307 to a sensor 316 of a detector assembly 314. It is noted that sensor 316 and detector assembly 314 may include any sensor and detector assembly known in the art. The sensor 316 may include, but is not limited to, a CCD sensor or a CCD-TDI sensor. Further, sensor 316 may include, but is not limited to, a line sensor or an electron-bombardment line sensor.

In embodiments, detector assembly 314 is communicatively coupled to a controller 318 including one or more processors 320 and memory 322. For example, the one or more processors 320 may be communicatively coupled to memory 322, wherein the one or more processors 320 are configured to execute a set of program instructions stored on memory 322. In embodiments, the one or more processors 320 are configured to analyze the output of detector assembly 314. In embodiments, the set of program instructions are configured to cause the one or more processors 320 to analyze one or more characteristics of specimen 307. In embodiments, the set of program instructions are configured to cause the one or more processors 320 to modify one or more characteristics of system 300 in order to maintain focus on the specimen 307 and/or the sensor 316. For example, the one or more processors 320 may be configured to adjust the objective lens 306 or one or more optical elements 302 in order to focus broadband light 118 from LSP broadband light source 100 onto the surface of the specimen 307. By way of another example, the one or more processors 320 may be configured to adjust the objective lens 306 and/or one or more optical elements 310 in order to collect illumination from the surface of the specimen 307 and focus the collected illumination on the sensor 316.

It is noted that the system 300 may be configured in any optical configuration known in the art including, but not limited to, a dark-field configuration, a bright-field orientation, and the like. The system 300 may be configured as any type of metrology tool known in the art such as, but not limited to, a spectroscopic ellipsometer with one or more angles of illumination, a spectroscopic ellipsometer for measuring Mueller matrix elements (e.g., using rotating compensators), a single-wavelength ellipsometer, an angle-resolved ellipsometer (e.g., a beam-profile ellipsometer), a spectroscopic reflectometer, a single-wavelength reflectometer, an angle-resolved reflectometer (e.g., a beam-profile reflectometer), an imaging system, a pupil imaging system, a spectral imaging system, or a scatterometer.

Additional details of various embodiments of optical characterization system 300 are described in U.S. Pat. No. 7,957,066B2, entitled "Split Field Inspection System Using Small Catadioptric Objectives," issued on Jun. 7, 2011; U.S. Published Patent Application 2007/0002465, entitled "Beam Delivery System for Laser Dark-Field Illumination in a Catadioptric Optical System," published on Jan. 4, 2007; U.S. Pat. No. 5,999,310, entitled "Ultra-broadband UV Microscope Imaging System with Wide Range Zoom Capability," issued on Dec. 7, 1999; U.S. Pat. No. 7,525,649 entitled "Surface Inspection System Using Laser Line Illumination with Two Dimensional Imaging," issued on Apr. 28, 2009; U.S. Published Patent Application 2013/0114085, entitled "Dynamically Adjustable Semiconductor Metrology System," by Wang et al. and published on May 9, 2013; U.S. Pat. No. 5,608,526, entitled "Focused Beam Spectroscopic Ellipsometry Method and System, by Piwonka-Corle et al., issued on Mar. 4, 1997; and U.S. Pat. No. 6,297,880, entitled "Apparatus for Analyzing Multi-Layer Thin Film Stacks on Semiconductors," by Rosencwaig et al., issued on Oct. 2, 2001, which are each incorporated herein by reference in their entirety.

The one or more processors 320 of the present disclosure may include any one or more processing elements known in the art. In this sense, the one or more processors 320 may include any microprocessor-type device configured to execute software algorithms and/or instructions. In embodiments, the one or more processors 320 may consist of a desktop computer, mainframe computer system, workstation, image computer, parallel processor, or other computer system (e.g., networked computer) configured to execute a program configured to operate the system 300 and/or LSP broadband light source 100, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute program instructions from a non-transitory memory medium 322. Moreover, different subsystems of the various systems disclosed may include processor or logic elements suitable for carrying out at least a portion of the steps described throughout the present disclosure. Therefore, the above description should not be interpreted as a limitation on the present disclosure but merely an illustration.

The memory medium 322 may include any storage medium known in the art suitable for storing program instructions executable by the associated one or more processors 320. For example, the memory medium 322 may include a non-transitory memory medium. For instance, the memory medium 322 may include, but is not limited to, a read-only memory, a random access memory, a magnetic or optical memory device (e.g., disk), a magnetic tape, a solid state drive, and the like. In embodiments, the memory 322 is configured to store one or more results and/or outputs of the various steps described herein. It is further noted that memory 322 may be housed in a common controller housing with the one or more processors 320. In an alternative embodiment, the memory 322 may be located remotely with respect to the physical location of the processors 320. For instance, the one or more processors 320 may access a remote memory (e.g., server), accessible through a network (e.g., internet, intranet, and the like). In embodiments, the memory medium 322 maintains program instructions for causing the one or more processors 320 to carry out the various steps described through the present disclosure.

Figure 4:
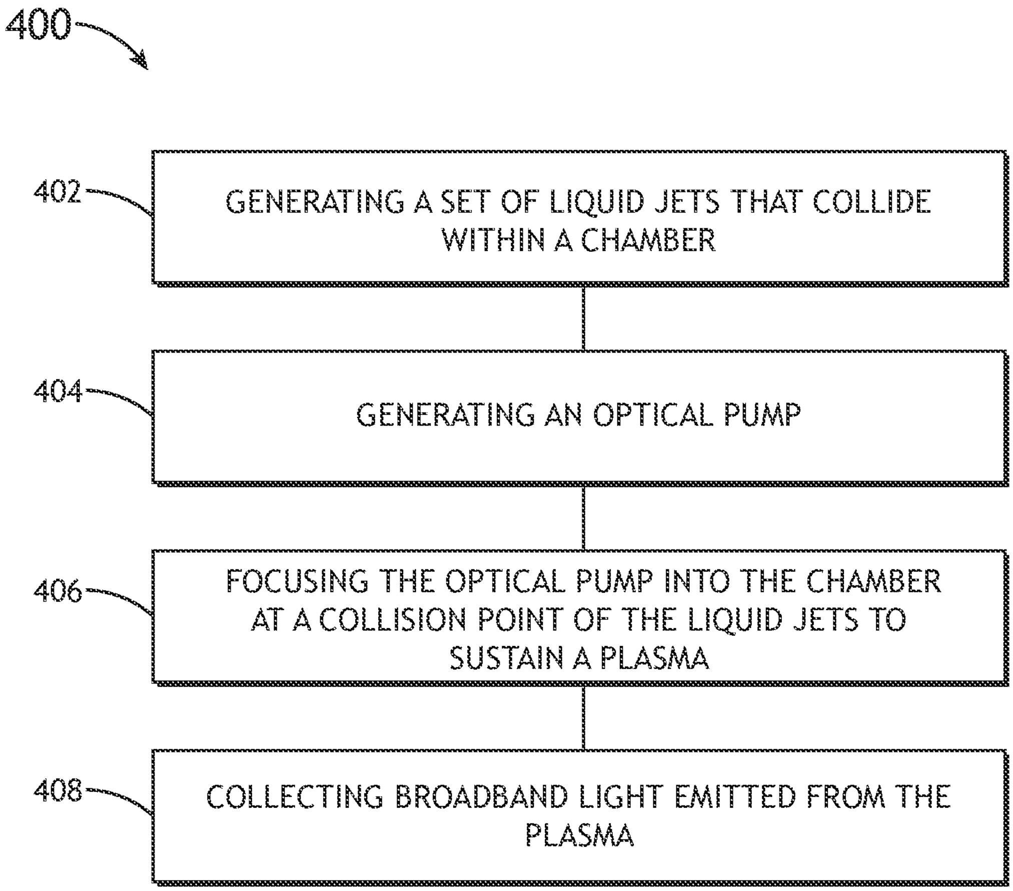
FIG. 4 illustrates a flow diagram depicting a method for generating broadband light, in accordance with one or more embodiments of the present disclosure.

FIG. 4 illustrates a flow diagram depicting a method 400 for generating broadband light 118, in accordance with one or more embodiments of the present disclosure. It is noted herein that the steps of method 400 may be implemented all or in part by LSP broadband light source 100. It is further recognized, however, that the method 400 is not limited to the LSP light source 100 in that additional or alternative system-level embodiments may carry out all or part of the steps of method 400.

In step 402, a set of liquid jets are generated and arranged to collide within a gas containment structure. In embodiments, multiple liquid jet nozzles 102*a*, 102*b* deliver liquid jets 104*a*, 104*b* into the chamber 106 so that they collide at a plasma-generation location. The jet nozzles 102*a*, 102*b* may be fluidically coupled to one or more material sources (e.g., volume of liquid stored in one or more containers). For example, each jet nozzle 102*a*, 102*b* may be fluidically coupled to a single liquid container (not shown). By way of another example, each jet nozzle 102*a*, 102*b* may be fluidically coupled to separate, independent liquid containers. In this example, the jet nozzles 102*a*, 102*b* may provide jets of the same or different materials.

In step 404, an optical pump is generated. In embodiments, the pump source 108 generates laser illumination 112, which acts as an optical pump for the plasma 116.

In step 406, the optical pump is focused into a region of the gas containment structure at a collision point of the multiple liquid jets 104*a*, 104*b* to sustain a plasma 116 in the region of the gas containment structure at the collision point of the liquid jets. For example, one or more pump focusing optics 110 may be used to focus pump illumination 112 through window 114 and into a region of the chamber 106 at a collision point of the multiple liquid jets 104*a*, 104*b* to sustain a plasma 116 at the collision point of the liquid jets 104*a*, 104*b*.

In step 410, a portion of the broadband light 118 from the plasma 116 is collected. For example, a portion of the broadband light 118 may be collected and delivered to one or more optical elements external to the chamber 106 at a collection location 128 through an aperture 122 in a wall of the chamber 106.

One skilled in the art will recognize that the herein described components, operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

The invention claimed is:

1. A broadband light source comprising:

a gas containment structure;

a plurality of jet nozzles, wherein the plurality of jet nozzles are configured to direct a plurality of liquid jets to collide within the gas containment structure, wherein the plurality of liquid jets include a first liquid jet and at least a second jet;

a laser pump source configured to generate an optical pump to sustain a plasma in a region of the gas containment structure at a collision point of the plurality of liquid jets; and a light collector element configured to collect at least a portion of broadband light emitted from the plasma.

2. The broadband light source of claim 1, wherein the plurality of jet nozzles comprise two or more jet nozzles.

3. The broadband light source of claim 2, wherein the plurality of jet nozzles comprise three or more jet nozzles.

4. The broadband light source of claim 1, further comprising one or more pump focusing optics for focusing the optical pump into the gas containment structure to the collision point of the plurality of liquid jets.

5. The broadband light source of claim 4, wherein the one or more pump focusing optics comprise at least one of a lens or a mirror.

6. The broadband light source of claim 5, wherein the one or more pump focusing optics comprise one or more annular optical elements.

7. The broadband light source of claim 1, wherein the plurality of jet nozzles are fluidically coupled to one or more liquid sources.

8. The broadband light source of claim 1, wherein a high-pressure region surrounding the collision point is maintained at pressure of at least 20 bar.

9. The broadband light source of claim 8, wherein a low-pressure region outside of the high-pressure region is maintained at pressure of less than 20 bar.

10. The broadband light source of claim 1, wherein a diameter of each of the plurality of jets is between 50 and 300 microns.

11. The broadband light source of claim 1, wherein a velocity of each of the plurality of jets is between 10 and 500 m/s.

12. The broadband light source of claim 1, wherein the plurality of liquid jets comprise at least one of liquid jets of at least one Ar, Kr, Xe, $N_2$, $H_2O$, $CH_4$, and $NH_3$.

13. The broadband light source of claim 1, wherein the plurality of liquid jets comprise at least one of liquid jets of a mixture of materials.

14. The broadband light source of claim 1, wherein the plurality of liquid jets comprise at least one of a suspension of a material in a liquid.

15. The broadband light source of claim 1, wherein the plurality of liquid jets comprise at least one of a solute in a in a solvent.

16. The broadband light source of claim 1, wherein the laser pump source comprises at least one of one or more CW lasers or one or more pulsed lasers.

17. The broadband light source of claim 1, wherein the gas containment structure comprise at least one of a plasma chamber, a plasma cell, or a plasma lamp.

18. A system comprising:

a broadband source comprising:

a gas containment structure;

a plurality of jet nozzles, wherein the plurality of jet nozzles are configured to direct a plurality of liquid jets to collide within the gas containment structure, wherein the plurality of liquid jets include a first liquid jet and at least a second jet;

a laser pump source configured to generate an optical pump to sustain a plasma in a region of the gas containment structure at a collision point of the plurality of liquid jets; and a light collector element configured to collect at least a portion of broadband light emitted from the plasma;

a set of illuminator optics configured to direct the broadband light from the light collector element to one or more samples;

a detector assembly; and a set of projection optics configured to receive illumination from the surface of the one or more samples and direct the illumination from the one or more samples to the detector assembly.

19. A method comprising:

generating a plurality of liquid jets to collide within a gas containment structure, wherein the plurality of liquid jets include a first liquid jet and at least a second jet;

generating an optical pump;

focusing the optical pump into a region of the gas containment structure at a collision point of the plurality of liquid jets to sustain a plasma in the region of the gas containment structure at the collision point of the plurality of the liquid jets; and collecting a portion of broadband light emitted from the plasma and delivering the portion of the broadband light to one or more optical elements external to the gas containment structure.

* * * * *